Patented Oct. 26, 1943

2,332,867

UNITED STATES PATENT OFFICE 2,332,867

CYCLOALKYLENE PHENOL

Joseph B. Niederl, Brooklyn, N. Y.

No Drawing. Application July 11, 1940,
Serial No. 344,942

8 Claims. (Cl. 260—624)

The present invention relates to phenolic compounds substituted by an unsaturated carbocyclic side chain and to their preparation. More particularly the invention relates to cycloalkylene phenols and to the processes by which they are produced.

It is known that aliphatic, alicyclic, and aromatic ketones can be condensed with phenolic compounds, such as phenol and ortho cresols, to produce condensation products of the di-(p-hydroxyphenyl) methane type. In accordance with the present invention, novel cycloalkenyl-monophenolic compounds are produced through an appropriate selection and reaction of a cyclic ketone and a phenolic reagent. The desired condensations are procured when the condensation agents have a substituent on a carbon atom adjacent to the carbon atom whereat the condensation juncture is made. These substituents seem to exert a steric hindrance effect and orient the reaction so as to produce a monophenol rather than a diphenol which, in accordance with prior knowledge, might be expected. It has been found that the substituents which seem to produce the steric hindrance cannot be present in both of the condensation agents as under such circumstances coumarins may be produced.

The cycloalkenyl-monophenols of the present invention are procured, therefore, either by condensing a meta-substituted phenolic compound with a cycloaliphatic ketone which is unsubstituted in its alpha position, or, by condensing a phenolic compound unsubstituted in its meta position with a cycloalkyl ketone substitued in its alpha position. In a preferred practice of the invention appropriately selected cycloalkyl ketones are condensed with appropriate phenolic compounds to produce cycloalkylene monophenols. The reaction is considered to take place in accordance with Formulas 1 and 2 below, which respectively illustrate the two types of condensation.

*Formula 1*

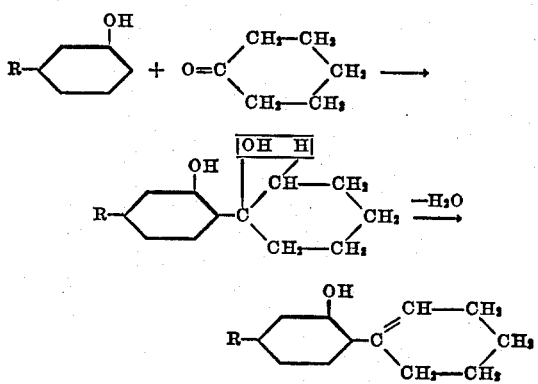

*Formula 2*

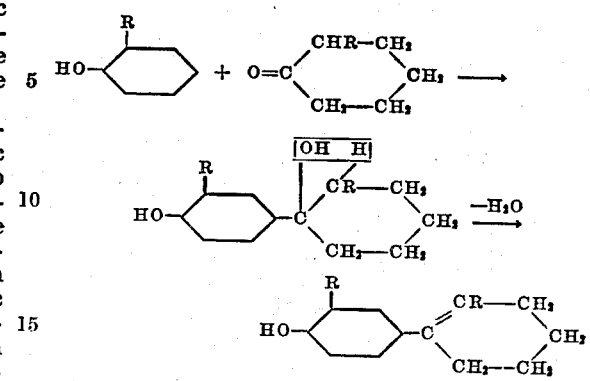

When the steric hindrance effect is to be imparted by the phenolic compound, such compounds as meta-substituted phenols may be used. Appropriate meta-substituted phenolic compounds are m-cresol, m-ethylphenol, 3,5-dimethyl-phenol, resorcinol-monomethylether, and the like. When meta substituted phenols are used, substituted or unsubstituted cyclic ketones may be used provided they are unsubstituted in the position adjacent to the carbonyl group. Hence, such compounds as cyclohexanone, 3,4-methylcyclohexanone and the like, may be condensed with meta-substituted phenolic compounds.

When the apparent steric hindrance effect is to be imparted by the cycloalkanone, any such ketone substituted in the alpha position with respect to the ketonic group is appropriate for the condensation, while the phenolic compound may be substituted or unsubstituted provided it is not substituted in its meta position. For instance, an appropriate condensation would involve condensing 2-methyl-cyclohexanone with phenol, ortho-cresol, ortho-ethyl-phenol, 2,6-dimethyl-phenol, guaiacol, catechol, and like phenolic compounds.

The condensations of the present invention take place at room or mildly elevated temperatures in the presence of an inorganic acidic catalyst and under certain circumstances advantageously in the presence of an inert solvent. The condensations are preferably performed with the use of stoichiometric proportions of the condensation agents.

Hydrochloric acid constitutes a preferred acidic catalyst but any other mineral acid, especially the strong mineral acids, such as sulfuric acid, may be used instead.

The addition of a suitable inert solvent has been found to be advantageous. Glacial acetic acid, propionic acid and similar inert solvents have proven especially desirable for such purpose. Water may also be used as a solvent when either the phenolic condensation agent or the ketonic condensation agent is water-soluble.

The novel cycloalkylene monophenols produced in accordance with the instant invention possess a double bond of the styrene type of unsaturated compounds. This characteristic makes them especially valuable for further synthesis. For example, it is possible to prepare di-bromides, bromo-hydrines, and glycols from them which in turn may be rearranged to the respective ketones. The halogen derivatives, particularly the halohydrines, on the other hand, can be treated with amines and thus provide a new type of physiologically active phenolic amino compounds. These halogen derivatives are also capable of undergoing further ring condensation yielding higher condensed ring systems.

The following examples illustrate the practice of the invention, but they are not to be considered as a limitation upon it.

EXAMPLE 1

*Condensation of cyclohexanone and m-cresol*

Half molar proportions each of m-cresol and cyclohexanone consisting of about 54.05 grams of m-cresol and about 49.05 grams of cyclohexanone are dissolved in 100 cc. of glacial acetic acid and the mixture is placed in an appropriate flask provided with a thermometer and a gas inlet tube extending to the bottom of the vessel. A vigorous stream of dry hydrogen chloride gas is passed into the system for about six hours at room temperature, then the flask is sealed and left standing at room temperature for two to three weeks. Thereafter the reaction mixture is dissolved in 200 cc. of benzene and washed several times with an equal volume of water and then extracted with 150 cc. of Claisen solution (equal mixture by volume of methyl alcohol and 50% aqueous potassium hydroxide solution). The Claisen solution extract is acidified with dilute hydrochloric acid whereupon the oil which separates out is taken up in 100 cc. of benzene, washed with water and dried with calcium chloride. The filtered benzene is distilled off and the residue distilled under diminished pressure. The fraction boiling between 120° and 140° C. is collected and re-distilled in vacuum and has the following constants: M. P. 65° C.; B. P. 130–133° C. at 4 mm. and $n_D^{25}$ 1.5413. The phenylurethan derivative melts at 114° C., the aryloxyacetic acid derivative at 160° C. and the bromine derivative at 150° C. The compound has the following structural formula:

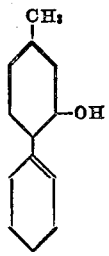

and may be designated as 1-(2'-hydroxy-4'-methyl) phenylcyclohexene-1.

EXAMPLE 2

*Condensation of cyclohexanone and m-ethylphenol*

Mixtures of m-ethylphenol and cyclohexanone in half molar proportions of each are condensed as described in Example 1, and worked up in a similar manner. The pure product obtained from about 61.05 grams of methyl-phenol and about 49.05 grams of cyclohexanone has the following constants: M. P. 55° C.; B. P. 145–148° C. at 5 mm.; $n_D^{24}$ 1.5421. The phenylurethan derivative melts at 134° C.; the aryloxyacetic acid derivative at 117° C. and the bromine derivative at 146° C. The compound has the following structural formula:

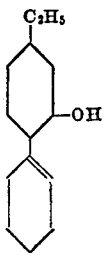

and may be designated as 1-(2'-hydroxy-4'-ethyl-phenyl) cyclohexene-1.

EXAMPLE 3

*2-methylcyclohexanone and phenol*

Half molar proportions each of phenol and o-methyl-cyclohexanone consisting of about 47.05 grams of phenol and about 56.05 grams of o-methyl-cyclohexanone are condensed as described in Example 1, except that no inert solvent is used. The reaction mixture is then left standing for ten days. At the end of this time this reaction mass has solidified and formed crystals. The crystalline mass is treated with hot water, filtered off such as on a sintered glass filter and recrystallized from diisobutylene. The recrystallized condensation product has a M. P. of 144° C. The phenylurethan derivative melts at 160° C., the aryloxyacetic acid derivative at 136° C., the bromine derivative at 104° C., and the benzoate derivative at 72° C. The compound has the following probable formula:

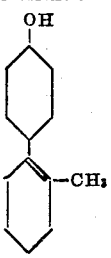

and may be designated as 2-methyl-1-(4'-hydroxy-phenyl) cyclohexene-1.

EXAMPLE 4

*Condensation of 2-methylcyclohexanone and o-cresol*

Half molar mixtures each of o-cresol and o-methyl-cyclohexanone consisting of about 54.05 grams of o-cresol and about 56.05 grams of o-methyl-cyclohexanone are condensed in the same manner as in Example 3. The reaction does not crystallize even upon prolonged standing. The reaction mass is allowed to stand for fourteen days and then it is dissolved in 200 cc. of benzene and worked up in the same manner as described for the phenol homologue in Example 3. The product is finally distilled in vacuum and the fraction boiling between 155–160° C. at 12 mm. crystallizes in the receiver. This crystalline mass is recrystallized from diisobutylene and has a melting point of 86° C. The phenylurethan derivative melts at 134° C., the aryloxyacetic acid derivative at 113° C., the bromine derivative at 107° C., and the benzoate derivative at 69° C. The compound has the following probable formula:

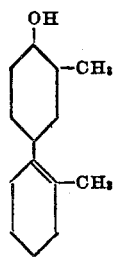

and may be designated as 2-methyl-1-[(4'-hydroxy-3'-methyl)-phenyl] cyclohexene-1.

EXAMPLE 5

*Condensation of 2-methylcyclohexanone and guaiacol*

Half molar proportions each of guaiacol and o-methyl-cyclohexanone consisting of about 62.05 grams of guaiacol and about 56.05 grams of o-methyl-cyclohexanone are dissolved in 50 cc. of glacial acetic acid and condensed as described in Examples 3 and 4. There is no deposition of crystals. The mixture is treated on a water bath with dry hydrogen chloride for another twelve hours. Usually no crystallization occurs, even after standing for another two months. After this time, the reaction mixture is dissolved in 200 cc. of benzene and washed several times with an equal volume of water and then extracted with 150 cc. of Claisen solution. The Claisen solution extract is acidified with dilute hydrochloric acid, the oil which separates out is taken up in 100 cc. of benzene, washed with water and dried over calcium chloride. The benzene is distilled off and the residue is distilled under diminished pressure. A fraction is obtained, which after redistillation, boils between 155–175° C. at 14 mm. pressure. The arylacetic acid derivative has a melting point of 73° C. The compound has the following probable formula:

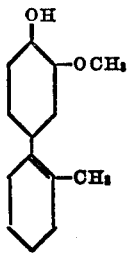

and may be designated as 2-methyl-1-(3'-methoxy-4'-hydroxy-phenyl) cyclohexene-1.

It should be understood that the invention is not limited to the specific reagents, reaction conditions and reaction products set out herein, but that it extends to all equivalent materials and procedures which will occur to those skilled in the art upon consideration of the scope of the appended claims.

I claim:

1. A new cycloalkenyl-monophenol, 2-methyl-1-(4'-hydroxyaryl) cycloalkene-1, wherein the hydroxyaryl radical is selected from hydroxyphenyl, ortho-hydroxy hydroxyphenyl, ortho-alkylated hydroxyphenyl and ortho-alkoxylated hydroxyphenyl radicals.

2. A new cycloalkenyl-monophenol, 2-methyl-1-(4'-hydroxy-3'-alkyl-phenyl) cyclohexene-1.

3. A new cycloalkenyl-monophenol, 2-methyl-1-(4'-hydroxy-3'-alkoxy-phenyl) cyclohexene-1.

4. A new compound: 2-methyl-1-(4'-hydroxyphenyl) cyclohexene-1.

5. A new compound: 2-methyl-1-(3'-methoxy-4'-hydroxyphenyl) cyclohexane-1.

6. A process for producing cycloalkenyl-monophenols which comprises condensing a 2-alkyl-cycloalkanone-1 with a compound selected from the group consisting of phenol, ortho-hydroxy phenol, ortho-alkylated phenol and ortho-alkoxylated phenol in the presence of a mineral acid.

7. A process for producing a cyclohexenyl-monophenyl which comprises condensing a 2-alkyl-cyclohexanone-1 with a compound selected from the group consisting of phenol, ortho-hydroxy phenol, ortho-alkylated phenol and ortho-alkoxylated phenol in the presence of a mineral acid.

8. A process of producing a cyclohexenylmonophenol which comprises condensing a 2-alkyl cyclohexanone-1 with a compound selected from the group consisting of phenol, ortho-hydroxy phenol, ortho-alkylated phenol and ortho-alkoxylated phenol in the presence of a mineral acid and an inert solvent.

JOSEPH B. NIEDERL.